(12) United States Patent
Singer-Schnoeller

(10) Patent No.: US 9,770,766 B2
(45) Date of Patent: Sep. 26, 2017

(54) HARD-MATERIAL THREADED CONNECTION

(71) Applicant: CERATIZIT AUSTRIA GESELLSCHAFT MBH, Reutte (AT)

(72) Inventor: Alexander Singer-Schnoeller, Weissenbach (AT)

(73) Assignee: Ceratizit Austria Gesellschaft m.b.H., Reutte (AT)

( * ) Notice: Subject to any disclaimer, the term of this patent is extended or adjusted under 35 U.S.C. 154(b) by 410 days.

(21) Appl. No.: 14/373,390

(22) PCT Filed: Jan. 18, 2013

(86) PCT No.: PCT/AT2013/000007
§ 371 (c)(1),
(2) Date: Jul. 21, 2014

(87) PCT Pub. No.: WO2013/106875
PCT Pub. Date: Jul. 25, 2013

(65) Prior Publication Data
US 2014/0360334 A1    Dec. 11, 2014

(30) Foreign Application Priority Data

Jan. 20, 2012 (AT) .................................. 21/2012

(51) Int. Cl.
*F16B 7/18* (2006.01)
*F16L 15/00* (2006.01)
(Continued)

(52) U.S. Cl.
CPC .............. *B23B 51/00* (2013.01); *B23B 31/11* (2013.01); *B23B 51/02* (2013.01); *F16B 7/18* (2013.01);
(Continued)

(58) Field of Classification Search
CPC ......... B23B 31/11; B23B 51/00; B23B 51/02; B23B 2231/0204; B23B 2231/0244;
(Continued)

(56) References Cited

U.S. PATENT DOCUMENTS 3,782,848 A * 1/1974 Pfeifer .................. B23B 51/107
408/156
4,076,064 A * 2/1978 Holmes ................... F16B 39/30
411/285
(Continued)

FOREIGN PATENT DOCUMENTS

CN       1447034 A    10/2003
CN     102032258 A     4/2011
(Continued)

*Primary Examiner* — Gregory Binda
*Assistant Examiner* — Nahid Amiri
(74) *Attorney, Agent, or Firm* — Laurence A. Greenberg; Werner H. Stemer; Ralph E. Locher

(57) ABSTRACT

A hard-material threaded connection includes a structural part, which has a hard material and a first threaded portion formed in the hard material, and a component having higher elasticity that has a second threaded portion cooperating with the first threaded portion. The first threaded portion and the second threaded portion have a different thread pitch.

8 Claims, 3 Drawing Sheets

(51) Int. Cl.
*B23B 51/00* (2006.01)
*B23B 51/02* (2006.01)
*B23B 31/11* (2006.01)

(52) U.S. Cl.
CPC ............ *B23B 2231/0204* (2013.01); *B23B 2231/0244* (2013.01); *B23B 2251/02* (2013.01); *Y10T 29/49826* (2015.01); *Y10T 83/9457* (2015.04); *Y10T 403/68* (2015.01)

(58) Field of Classification Search
CPC .......... B23B 2251/02; B23B 31/1122; B23B 2260/056; B23B 2260/034; F16B 39/30; F16B 5/0275; Y10T 403/68; Y10T 83/9457; Y10T 29/49826; Y10T 29/49881; Y10T 29/49833; Y10T 29/49835; Y10T 29/49837
USPC ..... 403/307, 343; 411/307, 389; 407/32, 34, 407/40, 42; 408/201
See application file for complete search history.

(56) References Cited

U.S. PATENT DOCUMENTS

| | | | |
|---|---|---|---|
| 4,225,274 A | 9/1980 | Katz | |
| 4,321,814 A * | 3/1982 | Martin | B21J 15/043 72/114 |
| 4,594,039 A * | 6/1986 | Witte | F16B 39/30 411/311 |
| 4,842,464 A * | 6/1989 | Green | F16B 37/12 411/307 |
| 5,316,417 A | 5/1994 | Romi | |
| 5,848,554 A * | 12/1998 | Kober | B60S 9/08 192/34 |
| 5,904,455 A | 5/1999 | Krenzer et al. | |
| 5,967,007 A * | 10/1999 | Scheer | B23B 5/40 82/1.2 |
| 6,485,235 B1 * | 11/2002 | Mast | B23B 51/02 408/1 R |
| 7,131,799 B2 * | 11/2006 | Stokey | B23B 51/0009 408/230 |
| 7,544,026 B2 * | 6/2009 | Durfee | B23B 31/005 408/201 |
| 8,226,333 B2 | 7/2012 | Kakai et al. | |
| 8,690,500 B2 | 4/2014 | Spichtinger et al. | |
| 2001/0002963 A1 | 6/2001 | Haje et al. | |
| 2002/0021945 A1 * | 2/2002 | Harpaz | B23B 31/11 407/53 |
| 2002/0168239 A1 | 11/2002 | Mast et al. | |
| 2010/0247263 A1 * | 9/2010 | Azegami | B23B 31/1107 409/234 |
| 2012/0009027 A1 * | 1/2012 | Sharivker | B23B 31/11 407/42 |
| 2012/0014760 A1 | 1/2012 | Glimpel et al. | |
| 2013/0251471 A1 * | 9/2013 | Craig | B23B 51/02 408/200 |

FOREIGN PATENT DOCUMENTS

| | | | |
|---|---|---|---|
| DE | 870344 C | 3/1953 | |
| DE | 1151774 B | 7/1963 | |
| DE | 4435857 A1 | 4/1996 | |
| DE | 10302873 B3 | 7/2004 | |
| DE | 102009048010 B3 | 2/2011 | |
| EP | 0771934 A2 | 5/1997 | |
| EP | 1847345 A2 | 10/2007 | |
| GB | 806553 A | 12/1958 | |
| GB | 1070808 A | 6/1967 | |
| GB | 2356907 A | 6/2001 | |
| JP | H09168903 A | 6/1997 | |
| JP | H11309611 A | 11/1999 | |
| JP | 2002519599 A | 7/2002 | |
| JP | 2004209615 A | 7/2004 | |
| JP | 2007064378 A | 3/2007 | |
| JP | 2008161989 A | 7/2008 | |
| JP | 2011056594 A | 3/2011 | |
| JP | 2011183491 A | 9/2011 | |
| SE | WO 2006033616 A1 * | 3/2006 | ......... B23B 31/1107 |

\* cited by examiner

HARD-MATERIAL THREADED CONNECTION

BACKGROUND OF THE INVENTION

Field of the Invention

The present invention relates to a hard-material threaded connection, to a method for forming a threaded connection between hard material and a component having higher elasticity and to a structural part having a hard material and possessing a first threaded portion formed in the hard material.

Particularly in the sector of the cutting machining of metallic workpieces, it is known to use tools which have a tool body and an exchangeable cutter, particularly in the form of a cutting head, fastened to the tool body. The cutter is in this case usually manufactured from a hard material and is designed to come into cutting engagement with the workpiece, whereas the tool body is formed from a material having higher elasticity (as compared with the hard material), such as, for example, from a steel, and connects the cutting head to other components of a machine tool. In this case, the tool body or a threaded body connected to the tool body forms a component having higher elasticity, and the cutting head is a structural part which has a hard material.

In the present context, the term "hard material" embraces hard metals, cermets and cutting ceramics. In this case, cutting ceramics are understood to mean ceramics which are used in metal cutting machining, in particular cubic boron nitride and polycrystalline diamond. In the present case, hard metal (also designated as "cemented carbide") is understood to mean a material in which hard metal carbides are embedded in a metallic matrix (binder). The metal carbides may in this case be formed, in particular, by carbides or composite carbides of the metals of groups IV to VI of the periodic table of elements, in particular, for example, by carbides or composite carbides of the metals W, Ti, Zr, Hf, V, Nb, Ta, Mo and Cr. The metallic matrix may be formed in particular, for example, by Co, Ni and/or Fe. Additions of further hard materials may also be present. Cermet is understood to mean a material in which ceramic particles, which may be formed, in particular, by carbo-oxides, oxides, borides or carbides, are embedded in a metallic matrix. The metallic matrix may in this case have, in particular, cobalt (Co), tungsten (W), molybdenum (Mo), niobium (Nb), titanium (Ti), zirconium (Zr), chromium (Cr) and/or nickel (Ni).

It is known to connect structural parts, which have a hard material or are formed from hard material, via a threaded connection to the component which has higher elasticity. In this case, the hard-material structural part is provided with a first threaded portion which is usually (but not necessarily) formed by an internal thread, and the component having higher elasticity is provided with a matching second threaded portion which is usually formed correspondingly by an external thread. The threaded connection is in this case, particularly with regard to a rotating tool, designed in such a way that it is loaded, upon the use of the tool, in a direction which screws shut the threaded connection somewhat further, so that an undesirable release of the threaded connection by turning loose is not to be feared. The threaded connections which are employed are standard threads, such as, for example, metric ISO threads.

The problem arises, in practice, that a failure of the threaded portion on the hard-material structural part may occur, inter alia, because of the different material properties of the hard material and of the material of the component having higher elasticity. It happens, in particular, that thread flights are stripped or ring-shaped chips or cracks occur in the structural part made from hard material.

BRIEF SUMMARY OF THE INVENTION

The object of the present invention is to provide an improved hard-material threaded connection, an improved method for forming a threaded connection between hard material and a component having higher elasticity and an improved structural part having a hard material and possessing a first threaded portion formed in the hard material, all of which eliminate or at least reduce the problem of failure of the threaded portion formed in the hard material.

The object is achieved by means of a hard-material threaded connection. Advantageous developments are specified in the dependent claims.

The hard-material threaded connection has a structural part, which has a hard material and a first threaded portion formed in the hard material, and a component having higher elasticity, which has a second threaded portion cooperating with the first threaded portion. The first threaded portion and the second threaded portion have a different thread pitch. The structural part and the component may be, in particular, constituents of a tool, in particular for cutting machining. The structural part may in this case be formed, in particular, by a cutter, in particular a cutting head, and the component having higher elasticity by a tool body or by a threaded body connected to a tool body. By the first threaded portion and the second threaded portion being formed with different thread pitches, load distribution, by means of which a failure of the first threaded portion formed in the hard material is prevented, can be achieved in a simple way in the hard-material threaded connection.

According to one refinement, the difference in the thread pitch amounts to more than 1.5%, preferably to more than 2%. In this case, failure of the first threaded portion formed in the hard material can be prevented especially reliably. The difference in the thread pitch preferably amounts to between 2.1% and 8%. If the difference in the thread pitch is too small, the desired effect is not achieved to a sufficient extent. On the other hand, if the difference is too great, even screwing together no longer becomes possible and, even if screwing together takes place, damage to the thread flights may occur. It must be remembered that the difference in the thread pitch may be smaller in the case of a larger number of load-bearing thread flights engaging one in the other, that is to say in a longer hard-material threaded connection, than in the shorter hard-material threaded connection in which only a few thread flights engage one in the other.

According to one refinement, the first threaded portion, which is formed in the hard material, is an internal thread. Particularly in this case, the risk of failure of the threaded portion formed in the hard material is very pronounced and can be reduced efficiently by means of the proposed implementation.

According to one refinement, the threaded portion designed as an internal thread has a higher pitch than the threaded portion designed as an external thread. This implementation achieves a force distribution in which tensile load is first exerted predominantly upon thread flights near a free end of the external thread and is exerted upon thread flights further away from the free end only when the load increases. As a result, a markedly increased load upon the thread becomes possible, without failure of the thread formed in the hard material occurring. Particularly when the threaded portion formed in the hard material is designed as an internal thread, this makes it possible, furthermore, to have a cost-effective use of a standard structural part with a standard thread for the component having higher elasticity.

According to one refinement, the second threaded portion is a standard thread and the first threaded portion has a thread pitch deviating from the standard. In this case, especially efficient and cost-effective implementation is made possible. The first threaded portion may in this case deviate from the standard, in particular, by more than 1.5%, preferably by more than 2% and more preferably by between 2.1% and 8%. The further parameters of the first threaded portion may preferably be executed as standard, so that the first threaded portion deviates from the standard solely in its pitch.

According to one refinement, the threaded portion designed as an internal thread is provided with a countersink in such a way that the internal thread is applied so as to be recessed with respect to a surface. In this case, the recessed application of the internal thread further reduces the risk of failure of this threaded portion.

The structural part which has the hard material is preferably an exchangeable cutter, in particular a cutting head. The structural part may in this case be, in particular, a cutter for cutting machining. Particularly with regard to structural parts of this type, the risk of failure of the hard-material threaded connection on account of the different elasticities of the materials is especially pronounced.

According to one refinement, the hard material is hard metal or cermet. Particularly where these materials are concerned, a hard-material threaded connection is often employed, and failure of a threaded portion formed in the hard material has to be avoided. However, it is also possible for a cutting ceramic to be used as hard material.

The object is also achieved by means of a method for forming a threaded connection between hard material and a component having higher elasticity. Advantageous developments are specified in the dependent claims.

The method has: screwing of a structural part, which has a hard material and a first threaded portion formed in the hard material, to a component having higher elasticity, which has a second threaded portion which cooperates with the first threaded portion, thereby forming a threaded connection. The first threaded portion and the second threaded portion have a different thread pitch. Screwing together the first threaded portion and the second threaded portion having different thread pitches achieves in a simple way, in the hard-material threaded connection, a load distribution, by means of which failure of the first threaded portion formed in the hard material is prevented.

According to one refinement, the first threaded portion is an internal thread and the second threaded portion is an external thread. Particularly in this case, the risk of failure of the threaded portion formed in the hard material is very pronounced and can be reduced efficiently by means of the proposed implementation.

According to one refinement, the second threaded portion is a standard thread and the first threaded portion has a thread pitch deviating from the standard. In this case, a standard component with a standard thread can be used as the second threaded portion for the component having higher elasticity. This is advantageous, since the first threaded portion is usually to be formed separately in the hard material.

The object is also achieved by means of a structural part, which has a hard material. Advantageous developments are specified in the dependent claims.

The structural part, which has a hard material, has a first threaded portion, formed in the hard material, for connection to a second threaded portion formed on a component having higher elasticity. The first threaded portion has a thread pitch deviating from the second threaded portion. By the first threaded portion being designed with a thread pitch deviating from the second threaded portion, load distribution, by means of which failure of the first threaded portion formed in the hard material is prevented, can be achieved in a simple way.

According to one refinement, the structural part is an exchangeable cutter, in particular a cutting head, for fastening to a tool body.

The object is also achieved by means of a use of an above-specified hard-material threaded connection. This is a use for fastening a cutter, in particular a cutting head, to a tool body.

Further advantages and expediencies of the invention may be gathered from the following description of exemplary embodiments, with reference to the accompanying figures.

Of these figures:

DESCRIPTION OF THE INVENTION

Figure 1:
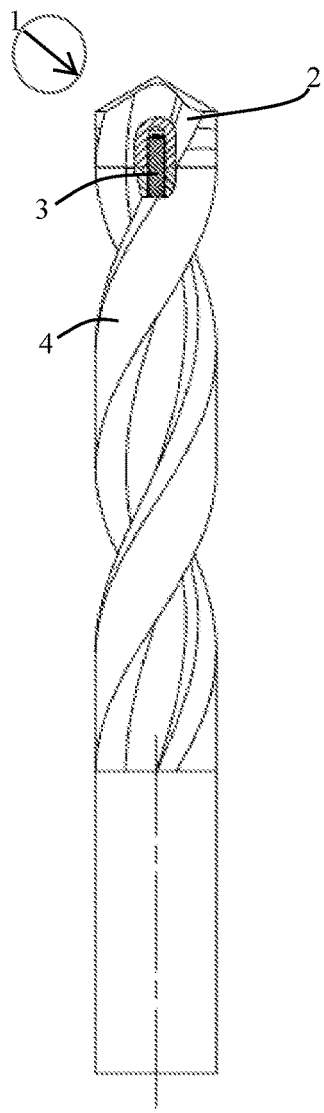
FIG. 1: shows a partially sectional view of a tool with a hard-material threaded connection according to one embodiment.
Figure 2:
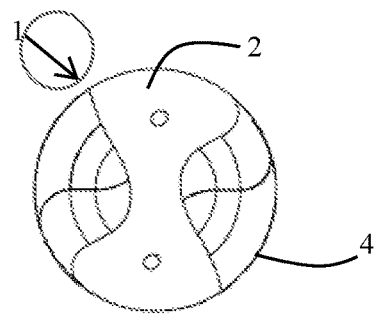
FIG. 2: shows a top view of the tool of FIG. 1.
Figure 3:
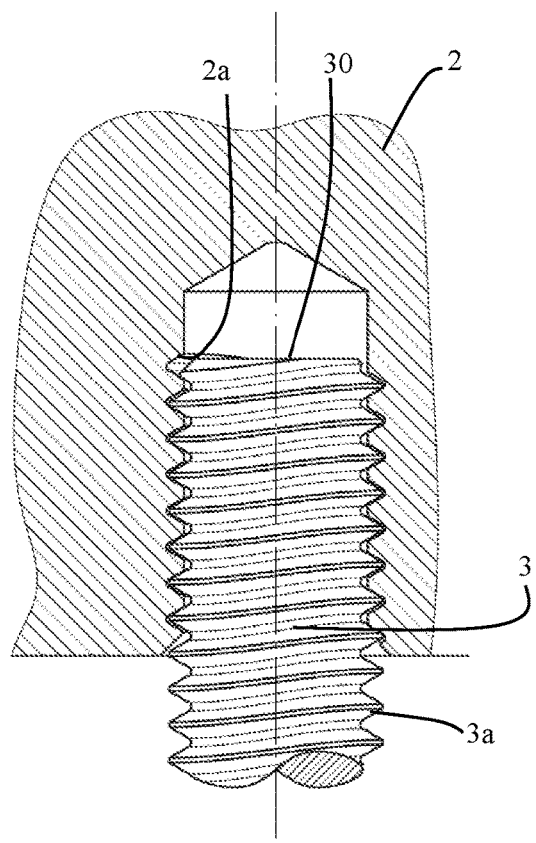
FIG. 3: shows an enlarged partially sectional view of a detail of the hard-material threaded connection in the tool of FIG. 1.

An embodiment will be described below with reference to FIG. 1 to FIG. 4.

In the embodiment, the hard-material threaded connection is implemented in a tool 1 with a structural part 2, which has a hard material, and with a component 3 having higher elasticity. The component 3 having higher elasticity may, for example, be manufactured, in particular, from steel. In the embodiment illustrated in the figures, the tool 1 is formed by a drill having an exchangeable cutter made from a hard material. In this case, the structural part 2 which has a hard material is formed by the exchangeable cutter which is designed as a cutting head. In the embodiment illustrated in FIG. 1 to FIG. 4, the component 3 having higher elasticity is formed by a separate threaded body which is connected to a tool body 4. However, it is also possible, for example, that the component having higher elasticity is formed directly by a tool body which is provided with a threaded portion.

In the exemplary embodiment, the tool body 4 is manufactured in a way known per se from tool steel and is provided with spiral flutes. The structural part 2, which is implemented as an exchangeable cutting head, is designed in such a way that it can be fastened to the tool body 4 via a hard-material threaded connection which is described in more detail below. In the exemplary embodiment illustrated, the component 3 is firmly connected to the tool body 4, for example via a screw connection. The component 3 may in this case, in particular, likewise be formed from a tool steel.

The structural part 2 (that is to say, the exchangeable cutter in the embodiment) is provided with a first threaded portion 2a, and the component 3 having higher elasticity (that is to say, the threaded body in the embodiment) is provided with a second threaded portion 3a. The first threaded portion 2a is formed in the hard material of the structural part 2. The second threaded portion 3a is formed in the material of higher elasticity of the component 3. The hard material, because of its high hardness, has relatively low elasticity, whereas the component 3 and the tool body 4 have a substantially lower hardness and a higher elasticity.

In the embodiment illustrated, the first threaded portion 2a is designed as an internal thread made from the hard material. The second threaded portion 3a is designed as an external thread on the component 3. Although this configuration is preferred, it is, however, also possible, for example, to design the first threaded portion as an external thread made from hard material and the second threaded portion as an internal thread.

The first threaded portion 2a and the second threaded portion 3a are designed to cooperate in order to form a hard-material threaded connection. In this case, however, the first threaded portion 2a and the second threaded portion 3a have a different thread pitch, as described in more detail below with reference to FIG. 3 and FIG. 4.

In the exemplary embodiment, the second threaded portion 3a is designed as a standard thread (for example, as a metric ISO thread). By contrast, the first threaded portion 2a, formed in the hard material, is designed with a thread pitch deviating from the standard. The first threaded portion 2a has in this case a thread pitch deviating from the second threaded portion 3a (and therefore from the standard) by between 2.1% and 8%. In the exemplary embodiment, the first threaded portion 2a has a thread pitch which deviates from the thread pitch of the second threaded portion 3a by 3%. In this case, the first threaded portion 2a designed as an internal thread has a higher thread pitch than the second threaded portion 3a designed as an external thread.

Figure 4:
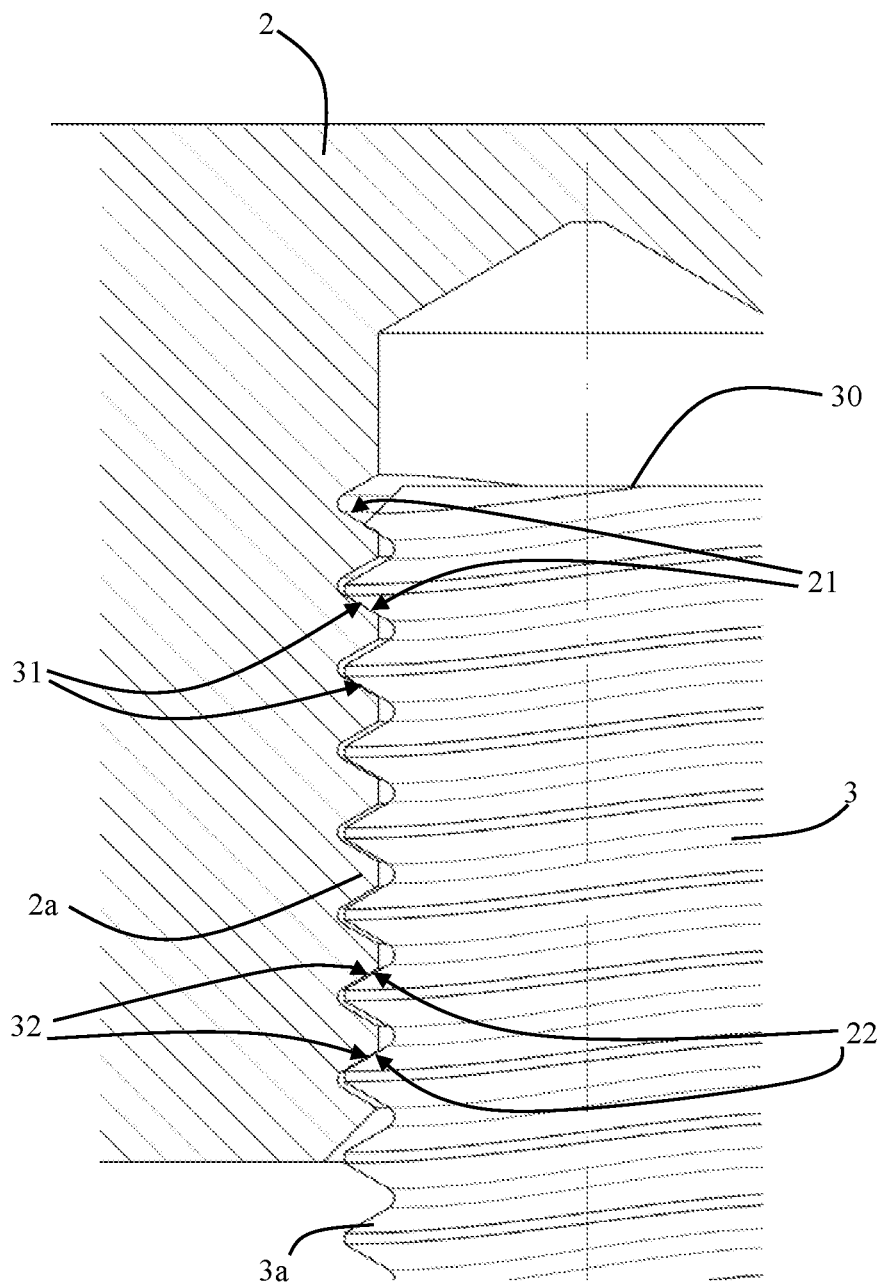
FIG. 4: shows a more enlarged partially sectional view of a detail of the threaded portions in the hard-material threaded connection.

The effect achieved by this difference in the thread pitch is explained in more detail below with reference to FIG. 4. FIG. 4 shows the thread flights of the hard-material threaded connection in an enlarged illustration, so that the individual flanks of the internal thread and of the external thread can be seen. FIG. 4 is an illustration of the hard-material threaded connection in a fully screwed-in state.

As can be seen in FIG. 4, near a free end 30 of the second threaded portion 3a (at the top in FIG. 3), the thread flanks 31 of the second threaded portion 3a which face away from the free end 30 bear against the corresponding thread flanks 21, facing the free end 30, of the first threaded portion 2a designed as an internal thread. In that region of the hard-material threaded connection which faces away from the free end 30, that is to say near the surface of the structural part 2 (at the bottom in FIG. 3), the thread flanks 32 of the second threaded portion 3a which face the free end 30 bear against the corresponding thread flanks 22 of the first threaded portion 2a which face away from the free end 30.

As a result, in the screwed-together state, the external thread is subjected to slight prestress, so that the flanks of the external thread near the free end are subjected to tension and the flanks of the external thread remote from the free end are subjected to compression.

As a result of this configuration, in the event of tensile load upon the hard-material threaded connection or upon the threaded portion designed as an external thread, in the case of low tensile load the thread flights lying well inside in the internal thread (that is to say, near the free end of the external thread) are first loaded and, with increasing tensile load and expansion of the body which has the external thread, the thread flights lying further out (remote from the free end of the external thread) are also loaded.

Figure 6:
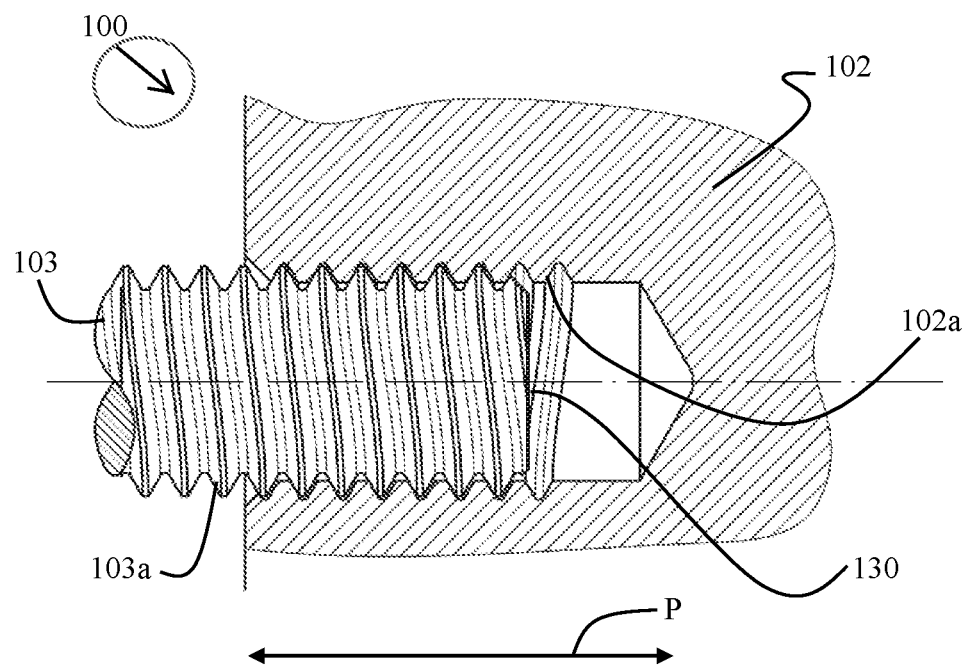
FIG. 6: shows a partially sectional view of a detail of a conventional hard-material threaded connection.

For comparison, FIG. 6 illustrates a conventional hard-material threaded connection 100, in which both the first threaded portion 102a formed in the hard material 102 and the second threaded portion 103a formed on the component 103 having higher elasticity are designed as standard threads. In this conventional configuration, in the event of tensile load upon the hard-material threaded connection (illustrated diagrammatically by a double arrow P), mainly the thread flights remote from the free end 130 and near the surface of the structural part made from hard material 102 are loaded, this increasing with an increase in tensile load. There is therefore the risk that these thread flights are stripped off. In the case of high load peaks, this may lead, due to the formation of cracks, to chips or destruction of the entire structural part made from hard material.

Figure 5:
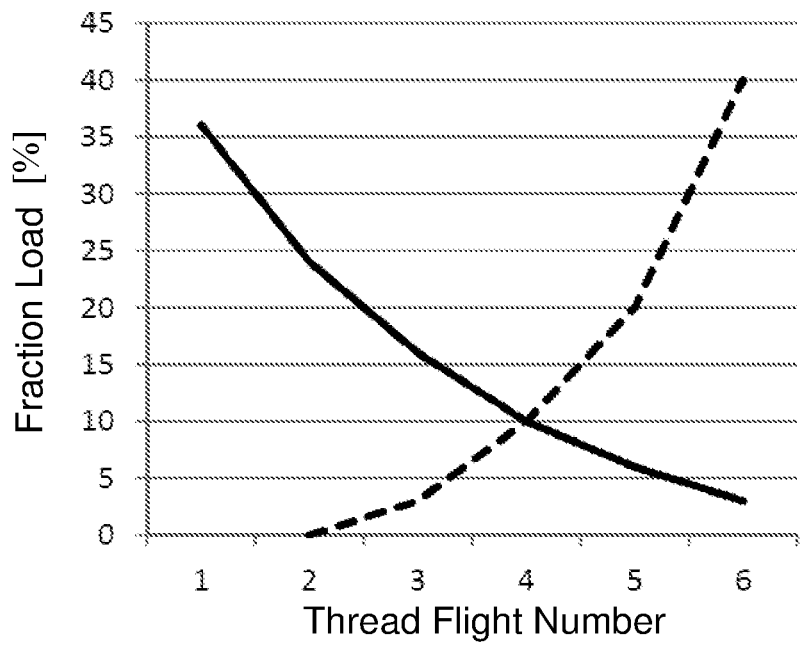
FIG. 5: shows a graphical illustration to explain the load distribution in the hard-material threaded connection, as compared with a conventional hard-material threaded connection.

The advantages of the hard-material threaded connection according to the invention, as compared with a conventional hard-material threaded connection in which both the first threaded portion and the second threaded portion are designed as standard threads, are described in more detail below with reference to FIG. 5. FIG. 5 illustrates, by the example of a six-flight thread, what load fraction in % is attributable to the respective force-transmitting thread flights, specifically, on the one hand, for a conventional hard-material threaded connection 100 (unbroken line) and, on the other hand, in the hard-material threaded connection according to the embodiment (dashed line).

The force-transmitting thread flights are in this case numbered, starting from the surface of the hard material, that is to say thread flight number 1 is located near the surface of the hard material and thread flight number 6 is located near the free end of the external thread.

As can be seen in FIG. 5, in the conventional hard-material threaded connection (unbroken line) the first thread flights bear the most load and the thread flights in the direction of the free end of the external thread bear increasingly less load. In contrast to this, in the hard-material threaded connection according to the embodiment (dashed line), mainly the thread flights near the free end of the external thread bear the load.

The advantages achieved by means of the hard-material threaded connection according to the embodiment also become clear from the following description of examples.

EXAMPLES

Tests were conducted, in which internal threads with a different pitch were formed by means of a helical milling method in each case in an essentially cylindrical structural part made from hard material, in particular hard metal.

In each case a threaded connection was made by means of a steel screw (screw quality 8.8 phosphated) with a metric M6 ISO thread (pitch 1.000 mm) and with a thread depth of 15 mm. The yield strength of the screw was reached at a tensile force of 12864 N and a break occurred at 16080 N.

In sample 1, an unmodified M6 ISO thread (pitch 1.000 mm) was formed in the hard material.

In sample 2, an M6 thread with a thread pitch (pitch 1.010 mm), increased by 1% as compared with the standard thread, was formed in the hard material.

In sample 3, an M6 thread with a thread pitch (pitch 1.020 mm), increased by 2% as compared with the standard thread, was formed in the hard material.

In sample 4, an M6 thread with a thread pitch (pitch 1.030 mm), increased by 3% as compared with the standard thread, was formed in the hard material.

In sample 5, an M6 thread with a thread pitch (pitch 1.040 mm), increased by 4% as compared with the standard thread, was formed in the hard material.

When the hard-material threaded connection was being formed, samples 1 to 3 could be screwed in by hand, but a tool was already required in order to screw in samples 4 and 5 because of the resulting prestress. All the samples were loaded to above the yield strength of the screw on a hydraulic press. It was observed under which load the first thread flights were stripped.

Results

In sample 1, cracking could be heard even under a tensile force of approximately 4000 N, and ring-shaped chopping occurred. In sample 2, destruction of the structural part made from hard material occurred at a tensile force of approximately 10000 N. In samples 4 and 5, by contrast, stripping of thread flights in the structural part made from hard material could no longer be observed until the breaking load of the screw was reached.

Development

According to a development of the embodiment, the structural part 2 is again provided with a first threaded portion designed as an internal thread. In contrast to the embodiment described above, in the development the first threaded portion is provided with an oblique countersink in such a way that the first thread flight of the internal thread does not start directly at the surface of the structural part made from hard material, but instead at a stipulated spatial distance from the surface. The internal thread is thus applied so as to be recessed with respect to the surface. In this way, the stability of the first threaded portion formed in the hard material can be additionally increased.

Although, in terms of the embodiment, a structural part 2 has been described which is formed entirely from hard material, it is also possible, for example, that the structural part 2 is formed only in regions made from hard material. In this case, too, the first threaded portion 2a is formed in a region of the structural part 2 which is made from hard material.

Although, in terms of the embodiment, it has been described that the hard-material threaded connection is used in the case of a tool in the form of a drill, other applications are also possible, in which a structural part made from a hard material is connected to a material of lower elasticity via a threaded connection, in particular (but not only) applications in the case of other tools, in particular cutting tools.

The invention claimed is:

1. A hard-material threaded connection, comprising:
a structural part having a hard material selected from the group consisting of a cemented carbide, a cermet and a cutting ceramic and having a first threaded portion formed in said hard material; and
a component having higher elasticity than said hard material and having a second threaded portion cooperating with said first threaded portion, said first portion and said second threaded portion having different thread pitches, wherein a difference in said thread pitches amount to more than more than 1.5%.

2. The hard-material threaded connection according to claim 1, wherein a difference in said thread pitches amounts to between 2.1% and 8%.

3. The hard-material threaded connection according to claim 1, wherein said first threaded portion is an internal thread.

4. The hard-material threaded connection according to claim 1, wherein said first and second threaded portions define an internal threaded portion and an external threaded portion, said internal threaded portion has a higher pitch than said external threaded portion.

5. The hard-material threaded connection according to claim 1, wherein said first threaded portion is configured as an internal thread and is provided with a countersink such that said internal thread is applied so as to be recessed with respect to a surface of said structural part.

6. The hard-material threaded connection according to claim 1, wherein said structural part which has said hard material is an exchangeable cutter.

7. The hard-material threaded connection according to claim 1, wherein said hard material is a hard metal or a cermet.

8. The hard-material threaded connection according to claim 1, wherein a difference in said thread pitches amounts to more than 2%.

* * * * *